United States Patent [19]

Gettert et al.

[11] 4,420,342

[45] Dec. 13, 1983

[54] METHOD OF PREVENTION OF DEPOSITS IN THE PIPES OF WASTE HEAT BOILERS

[75] Inventors: Hans Gettert, Gross-Sachsen; Knut Kaempfer, Ludwigshafen, both of Fed. Rep. of Germany

[73] Assignee: BASF Aktiengesellschaft, Fed. Rep. of Germany

[21] Appl. No.: 348,197

[22] Filed: Feb. 12, 1982

[51] Int. Cl.$^3$ .............................................. C23G 1/02
[52] U.S. Cl. ................................... 134/3; 134/22.12; 134/41
[58] Field of Search .......................... 134/3, 22.12, 41

[56] References Cited

U.S. PATENT DOCUMENTS 2,347,527  4/1944  Vanderbilt ........................ 134/3 X
2,895,856  7/1959  Hong ................................ 134/3

FOREIGN PATENT DOCUMENTS 885173  12/1961  United Kingdom .

*Primary Examiner*—Arthur D. Kellogg
*Attorney, Agent, or Firm*—Keil & Witherspoon

[57] ABSTRACT

A process for preventing deposits in the pipes of waste heat boilers employed for cooling gases in the partial autothermal oxidation of fossil fuels to prepare hydrogen or synthesis gases, wherein the pipes are flushed, at the operating temperature, with hydrogen-containing gases which contain little or no $H_2S$.

4 Claims, No Drawings

METHOD OF PREVENTION OF DEPOSITS IN THE PIPES OF WASTE HEAT BOILERS

Fuel gases or synthesis gases containing carbon monoxide and hydrogen are obtained, inter alia, by partially oxidizing fossil fuels, for example crude oil, residual oil, petroleum coke or even coal. To do so, the fossil fuel is reacted, at a high temperature, with oxygen in the presence of steam and/or carbon dioxide. To cool the gases and at the same time recover the sensible heat, the gases formed are passed through the pipes of a waste heat boiler, and steam is thereby generated.

The above fossil fuels contain not only carbon and hydrogen, but a whole range of inorganic constituents, for example sulfur, chlorine, iron, nickel, vanadium, alkali metals and alkaline earth metals, to mention only the most important.

On gasifying sulfur-rich starting materials, it is found that the pipes in the waste heat boiler acquire a deposit, and in particular do so preferentially in the colder part of the pipes, ie. in the vicinity of the gas exit. Depending on the pressure of the steam generated, the temperature is from 200° to 350° C. A chemical investigation of the deposits has shown that they consist predominantly of nickel sulfide, with small amounts of iron compounds and vanadium compounds.

The deposits result from the formation of volatile nickel, iron and vanadium chlorides in the hot reaction zone, which then condense on the pipe walls when cooling in the rear part of the waste heat boiler and there react with the $H_2S$ contained in the gas, to form the metal sulfides. Preferably, nickel is deposited, since it has a higher condensation temperature than either iron chloride or vanadium chloride. Moreover, formation of $NiCl_2$ is favored under the partial oxidation conditions, since, in the presence of steam, iron and vanadium preferably form the oxides.

Since blockage of the pipes of the waste heat boiler by metal sulfides normally only occurs on gasifying starting materials having a sulfur content of >2% by weight, but otherwise having comparable metal contents and chlorine contents, another, competing, reaction must participate in the formation of the deposits.

Since the cracked gas contains hydrogen and hydrogen sulfide, the following equilibrium is set up:

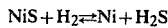

$$NiS + H_2 \rightleftharpoons Ni + H_2S$$

Any shift in the equilibrium depends on the temperature, and on the partial pressure of hydrogen and of hydrogen sulfide. A high $H_2S$ concentration favors the formation of nickel sulfide.

We have found that in waste heat boilers employed for cooling gases formed by partially oxidizing fossil fuels, existing deposits, preferably of nickel sulfide, can be removed and/or the formation of deposits can be prevented if the pipes are flushed, at the operating temperature, with hydrogen-containing gases which contain little or no $H_2S$.

In carrying out the process, it is advantageous if suitable fittings are incorporated so that the individual pipes of the waste heat boiler can be shut off, and the pipes are then, under operating conditions, flushed successively, working from the exit to the hot reaction zone, with a gas which is rich in $H_2$ and contains little or no $H_2S$. This treatment converts the NiS and the lattice transformation associated therewith causes the deposits to disintegrate. The nickel thereby formed is transported out of the pipes with the flushing gas. If necessary, the pipe can be additionally blown clean with steam or $N_2$.

The gas employed for converting the nickel sulfide is not lost, since it passes back into the process. Advantageously, the pipes are cleaned in continuous succession without requiring any restriction in production. The cleaning process generally requires from 1 to 3 days per pipe.

EXAMPLE

A small ceramic vessel filled with anhydrous $NiCl_2$ is placed in an iron pipe of 50 mm diameter and the pipe is heated, at the position of the vessel, to 800° C. by means of a muffle furnace. At the same time, an $N_2/HCl$ mixture is passed through the pipe. After about 1 hour, a deposit of $NiCl_2$ has formed in the cold part of the pipe.

The passage of the $N_2/HCl$ mixture is stopped and the part of the pipe in which the $NiCl_2$ has deposited is brought to a constant temperature of 280° C. At this temperature, a mixture of 98% of $H_2$ and 2% of $H_2S$ is passed through the pipe, thereby converting the $NiCl_2$ into NiS.

The addition of $H_2S$ is then stopped and hydrogen alone is passed in. In the course of 5 hours, the nickel sulfide deposit disintegrates and a nickel dust forms, which is blown out of the pipe with the stream of $H_2$.

We claim:

1. A process for preventing nickel, iron and vanadium deposits in the pipes of waste heat boilers employed for cooling gases which are formed by partially oxidizing metal and chloride-containing fossil fuel with more than 2 weight percent sulfur, wherein the pipes are flushed, at the operating temperature, with hydrogen-containing gases which contain little or no $H_2S$.

2. An improved method of producing synthesis gases containing carbon monoxide and hydrogen wherein fossil fuels having a sulfur content of greater than 2 percent by weight are gasified by reacting the fossil fuels at a high temperature with oxygen in the presence of steam and/or carbon monoxide and wherein the gases are passed through the pipes of a waste heat boiler to cool the gases, the improvement which comprises: periodically flushing the pipes of the boiler with hydrogen-containing gases at the operating temperature of the boiler, said flush gases containing substantially no $H_2S$.

3. The process of claim 2 wherein the pipes of the waste heat boiler are shut off and are thereafter flushed with said hydrogen-containing gas.

4. The process of claim 3 wherein the pipes of the waste heat boiler are successively shut off and are successively flushed, working from the exit to the hot reaction zone, with a gas which is rich in hydrogen and contains little or no $H_2S$.

* * * * *

UNITED STATES PATENT AND TRADEMARK OFFICE
CERTIFICATE OF CORRECTION

PATENT NO. :   4,420,342
DATED      :   December 13, 1983
INVENTOR(S) :  GETTERT et al.

It is certified that error appears in the above-identified patent and that said Letters Patent is hereby corrected as shown below:

IN THE TITLE PAGE:

Please insert the following:

[30]  Foreign Application Priority Data

March 14, 1981 [DE] Fed. Rep. of Germany....3109820

Signed and Sealed this

Twenty-seventh Day of March 1984

[SEAL]

Attest:

GERALD J. MOSSINGHOFF

Attesting Officer    Commissioner of Patents and Trademarks